Jan. 16, 1951

W. P. MASON 2,538,114

THICKNESS MEASUREMENT

Filed Oct. 17, 1944

INVENTOR
W. P. MASON
BY
E. V. Griggs
ATTORNEY

Jan. 16, 1951 W. P. MASON 2,538,114
THICKNESS MEASUREMENT
Filed Oct. 17, 1944 2 Sheets-Sheet 2

INVENTOR
W. P. MASON
BY
E. V. Griggs
ATTORNEY

Patented Jan. 16, 1951

2,538,114

UNITED STATES PATENT OFFICE 2,538,114

THICKNESS MEASUREMENT

Warren P. Mason, West Orange, N. J., assignor to Bell Telephone Laboratories, Incorporated, New York, N. Y., a corporation of New York Application October 17, 1944, Serial No. 559,096

3 Claims. (Cl. 73—67)

This invention relates in general to the application of compressional vibrations for measuring purposes and in particular apparatus for measuring thickness by means of ultrasonic vibrations.

In industry, a need has arisen for an accurate method for measuring thickness of the order of magnitude of one-half to one-sixteenth of an inch of metal parts which are inaccessible to the mechanical type gauges conventionally employed for such measurement. Various prior art methods for accomplishing such measurement have been tried, the most successful of which utilize X-rays.

One object of this invention is to increase the sensitivity of the detecting unit to resonant frequencies in a system for thickness measurement by ultrasonic vibrations.

Another object of this invention is to provide better contact between the testing unit and the test surface thereby strengthening oscillations in the test circuit.

A third object is to simplify the apparatus for measuring thickness with ultrasonic vibrations by decreasing the number of units.

Other objects may be seen from a study of the specification together with the drawings and claims as hereinafter set forth.

The applicant discloses an improved apparatus for measuring thicknesses of small-dimensional parts by a method utilizing supersonic vibrations disclosed in the copending application of R. A. Heising, Serial No. 559,097, filed October 17, 1944, now patent 2,484,623, which appears to be simpler and more accurate than the methods of the prior art.

Ultrasonic vibrations have been employed heretofore in long range measuring devices such as altimeters and depth sounders. Devices for detecting flaws in construction materials by means of ultrasonic vibrations such as disclosed in German Patent 569,598 to Muhlhauser, have recently found industrial application. Another apparatus which utilizes ultrasonic vibrations for measuring purposes is the sonic interferometer developed by G. W. Pierce which is described in the Proceedings of the American Academy of Sciences, vol. 50, p. 271, 1925. All of the abovementioned devices differ from apparatus of the type disclosed in the copending application of Heising and by the applicant in several essential respects, the most important being that none of them purport to measure thicknesses of a comparable order of magnitude to those measured by the applicant's device. Furthermore, in the prior art devices mentioned, measurements are made by means of ultrasonic vibrations reflected from a surface presumed to have a relatively high fixed impedance. In the applicant's device, however, measurements are made by virtue of the resonant changes in impedance with frequency of the specimen under study.

The method of measuring thickness by means of ultrasonic vibrations disclosed in the copending application of Heising may be briefly described as follows. A means is provided for irradiating a test specimen with a beam of high-frequency compressional vibrations. Whenever the specimen is an integral number of half wavelengths thick for the frequency of the irradiating beam, a resonant response may be detected.

In one embodiment of the invention as disclosed by Heising, a pair of piezoelectric crystals each of which is conventionally mounted between two electrodes, one of which acts as a supporting structure, are positioned so that their supporting electrodes contact opposite surfaces of a test specimen. Oscillator and amplifier circuits are electrically connected to one of the crystals to drive it at different desired frequencies over a given range. The second crystal is connected to a detecting and amplifying circuit which includes a current indicating device by means of which frequencies producing a maximum resonant response may be determined. Several frequencies giving maximum response may be detected for each specimen, the fundamental frequency determined therefrom, and the corresponding thickness read off of a calibration curve as described hereinafter.

The applicant discloses an improved embodiment of the Heising apparatus for measuring thickness in which ultrasonic vibrations are both generated and detected by a single unit comprising a bank of piezoelectric crystals and associated electrodes enclosed in a housing containing castor oil which is sealed by a rubber cap which contacts one surface of the test specimen. The crystal assemblage is electrically connected in one arm of an impedance bridge similar to that disclosed in Fig. 1 of Patent 1,994,658 to Marrison in which the balancing arm of the bridge includes a variable condenser adjusted to balance out the static capacitance of the crystal. Current indicating means connected in parallel with the two arms of the bridge indicates a state of unbalance therebetween whereby resonant frequencies may be detected with a high degree of sensitivity. The crystal is driven by means of a variable frequency oscillator inductively coupled to the bridge circuit.

Referring to the drawings.

Figure 4A:
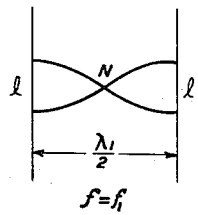
Figure 4B:
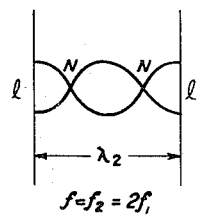
Figure 4C:
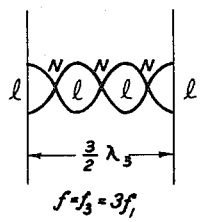
Figure 5:
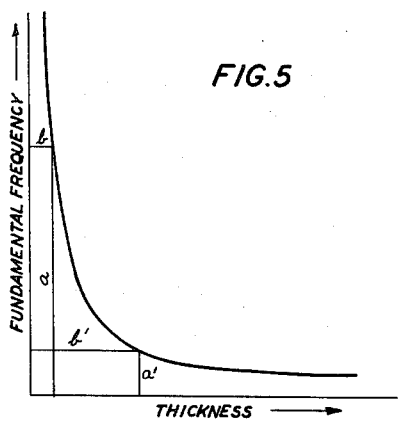
Figure 6:
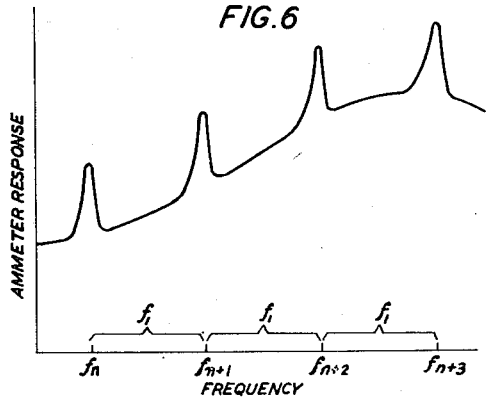

Figs. 4 (a), (b) and (c) are diagrams illustrating the theory of standing waves set up in the test specimen according to the applicant's ultrasonic testing method;

Fig. 5 shows a calibration curve of a type that might be used in conjunction with the applicant's testing apparatus; and Fig. 6 shows graphically the variation in the response of the bridge circuit ammeter with changes in frequency.

Figure 1:
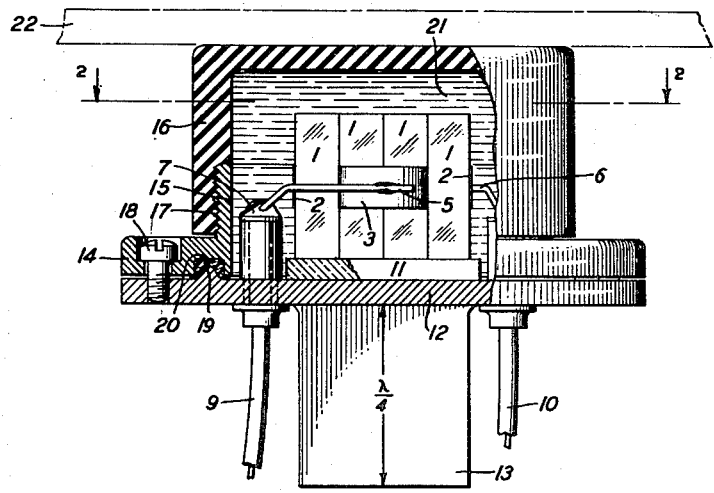
Fig. 1 shows a side-elevation of the crystal assemblage of the applicant's ultrasonic testing apparatus in contact with the test specimen, in which a portion of the cover is cut away to reveal a chamber in which a bank of crystals with connected electrodes is mounted in a bath of castor oil.
Figure 2:
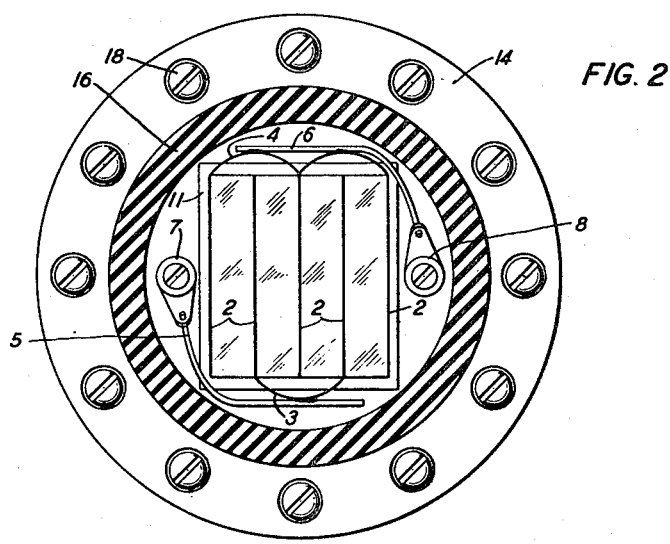
Fig. 2 shows a plan view of the apparatus of Fig. 1 cut through the section 2—2.
Figure 3:
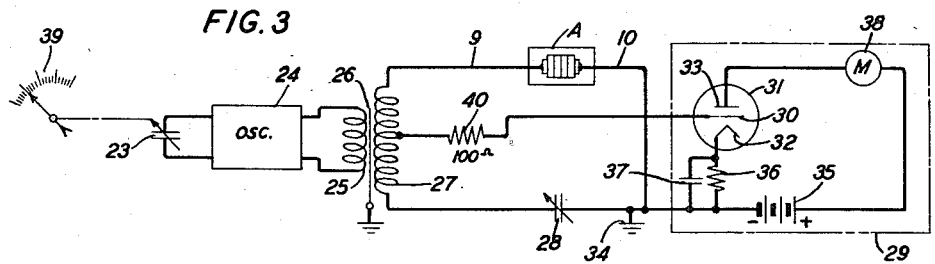
Fig. 3 shows a bridge circuit, into one arm of which is incorporated the crystal assemblage shown in detail in Figs. 1 and 2.

Referring to Figs. 1 and 2 of the drawings, the bank of crystals 1 may be of any material known in the art possessing piezoelectric properties and which may be excited to a longitudinal mode of vibration. For the purposes of the embodiment shown, the applicant has employed 45-degree Z-cut crystals of ammonium dihydrogen phosphate which has a high piezoelectric constant and therefore produces vibrations of relatively greater intensity than other well-known piezoelectric crystals. The two lateral surfaces of each of the crystals 1 are coated with layers of evaporated gold 2, which serve as electrodes. A thin piece of gold-plated nickel silver serves as an electrode contact 3 to connect the even electrodes together on one end of the crystal bank; on the opposite end of the crystal bank, a similar contact member 4 connects the odd electrodes together, so that alternate crystals are of the same polarity. Electrode contacts 3 and 4 are connected to contacts 7 and 8 respectively by means of conducting wires 5 and 6 which are composed of gold-plated nickel silver. Insulated lead wires 9 and 10 fastened to contacts 7 and 8 respectively make electrical connection between the crystal assemblage and the remainder of the circuit as shown in Fig. 3.

The bank of crystals 1 is cemented to the insulating ceramic support 11 which is fastened to a metal base comprising a flange 12 around the edge of which a number of threaded screw holes have been drilled. Machined as part of the metal base unit is a support 13, approximately a quarter wavelength thick in the mean frequency of the vibrating system and preferably rectangular in cross-section, which performs the multiple function of supporting the crystal bank, acting as a high impedance to the crystal vibrations, and serving as a means for holding the crystal assemblage in contact with the test specimen.

The cover of the unit comprises a metal flange 14 with a screw-threaded projection 15 of circular cross-section onto which the soft rubber cap 16 is screwed in an oil-tight joint 17. The flange 14 which fits onto the flange 12, has screw holes drilled at points corresponding to those on the flange 12 so that the cover is held in position on the base by means of screws 18. A circular beading 19 on the upper surface of the base flange 12 meshes with a gasket fitting 20 on the under side of the flange 14 to make an oil-tight joint.

Thus, when the cover is properly fixed on the base, the crystal bank 1 is enclosed in an oil-tight chamber 21 in which the applicant proposes to place castor oil in order to facilitate propagation of the supersonic vibrations electrically induced in the crystal. In order to reduce dissipation of the vibrational energy, the rubber cap 16 has substantially the same impedance to compressional vibrations as the castor oil bath in the chamber 21.

The resilience of the rubber cap enables it to conform to the shape of the test surface 22, thereby providing excellent contact, which factor increases the intensity of the vibrations set up in the test specimen.

The crystal assemblage, which is designated by the letter A in Fig. 3, is electrically connected into one arm of the bridge circuit there shown by means of the conductors 9 and 10. A driving oscillator 24, which may be of any well-known type equipped with a means 23 for progressively varying the frequency over a given range, is coupled to the bridge circuit by means of the primary 25 of the transformer 26. To one terminal of the secondary 27 of the transformer 26 is attached the conductor 9 of the crystal assemblage A, while to the other terminal of the secondary 27 is attached the variable condenser 28, the function of which is to balance out the static capacitance of the crystal assemblage A in a manner disclosed by Marrison in United States Patent 1,994,658. The center tap of the secondary coil 27 is connected through a 100-ohm protective resistance 40 to the circuit of the amplifier 29, where it feeds onto the grid 30 of the vacuum tube 31. The conductor 10 of the crystal assemblage A, together with a second terminal of the balancing condenser 28, is connected to ground 34.

The tube 31 is operated as a conventional amplifier-rectifier, the grid 30 being biased nearly to cut-off by means of a cathode resistor 36 which is shunted by the condenser 37. Changes in the frequency of the oscillator 24 cause corresponding changes in the impedance of the crystal assemblage A together with the test specimen as explained hereinafter, which are translated into potential changes on the grid 30. These are detected and amplified in the usual manner by the tube 31, causing a change in the average value of the direct plate current flowing from the power source 35 through the meter 38, to the plate 33, and hence through the tube to the filament 32, from which it passes to ground 34 through the cathode resistor 36. Thus, resonant frequencies are indicated by sharp changes in the impedance of the vibrating system which includes the crystal assemblage A and the test specimen 22. These show as corresponding changes in the response of the current indicating device 38, preferably some type of milliammeter.

In order to make the resonant response of the crystal more uniform with changes in frequency, Marrison has shown that it is desirable to balance out the inherent or static crystal capacitance. This is best done by adjusting the driving frequency of the oscillator 24 about 100 per cent off of the natural resonant frequency of the crystal 1, and varying the condenser 28 until the response in the current indicating device 38 is a minimum. The apparatus is then in condition for operation.

The theory of operation of the apparatus of Fig. 1 may be better understood by reference to the diagrams of Figs. 4 (a), (b) and (c). When the piezoelectric crystal 1 of Fig. 1 is driven at a given frequency by means of the oscillator 24, high frequency compressional vibrations are caused to be set up in the test specimen 22. If the thickness of the test specimen is an integral number of half wavelengths in accordance with the frequency of the induced vibrations, standing waves are set up, producing a sharp change in the impedance thereof which causes a resonant response in the indicating device 38 as shown in Fig. 6.

Assume that the frequency of the driving oscillator 24 is progressively varied over a given range, and that the frequency $f_1$ is found to be the lowest frequency which produces a resonant or maximum current response in the current indicator 38 for a test specimen of thickness $t$. As shown schematically in Fig. 4 (a), standing waves will presumably be set up in which there will be loops, or planes of maximum particle velocity, at the two outer surfaces of the test specimen, and a single node, or plane of minimum particle velocity, midway between the two surfaces. $f_1$ is then designated as the "fundamental" frequency of vibration for a particular specimen thickness $t$ under discussion and may be defined as the lowest frequency for which standing waves will be set up. The thickness $t$ of the test specimen is then equal to $\lambda_1/2$, where $\lambda_1$ represents the wavelength of the compressional vibrations corresponding to the frequency $f_1$ in the test medium. Inasmuch as the waves are compressional, it is to be understood that the motion of the vibrating particles takes place in the line of wave propagation, i. e., transverse to the plane of the test specimen 22.

Supposing that the driving frequency of the oscillator 24 is progressively increased to a frequency $f_2$ which is twice the fundamental frequency. As the frequency departs from $f_1$, the current response will gradually return to normal but will later begin to increase again giving a maximum current response in the current indicating device 38 as the frequency reaches $f_2$. In this second case, the standing waves set up in the test specimen will presumably assume a mode of vibration such as indicated schematically in Fig. 4 (b) in which loops appear at the two outer surfaces and two nodal planes appear intermediate. The wavelength of the vibrations in the test medium corresponding to the frequency $f_2$ will be designated as $\lambda_2$, where $\lambda_2$ is equal to the thickness of the test specimen. Similarly, if the driving frequency is increased to a value $f_3$ which is three times the fundamental frequency, three nodal planes will appear and the specimen thickness will be equal to 3/2 $\lambda_3$. It is obvious from the foregoing that as the frequency is progressively increased, there is a resonant response in the case of every frequency for which the thickness of the specimen is equal to an integral number of half wavelengths for the vibrations in the test medium.

From the above, it follows that for a specimen of given thickness, the numerical difference between any two successive resonant frequencies will give the fundamental frequency $f_1$ for a particular medium.

The fundamental equation for the velocity V of compressional vibrations in a medium may be stated as follows:

$$V=\sqrt{\frac{k}{d}}=f_1\lambda_1=f_1(2t)$$

where $k$ equals the elastic constant of the medium, $d$ equals the density of a given medium, $f$ equals frequency, and $\lambda$ equals wavelength of the vibrations in the given medium. From this relationship, it is seen that the product of the fundamental frequency $f_1$ and the specimen thickness $t$ is equal to a constant $$\tfrac{1}{2}\sqrt{\frac{k}{d}}$$

which may be designated as K. In plotting the relationship, $f_1t=K$ a hyperbola is obtained. It is thus seen that if for one particular material such as steel, the thicknesses of a series of test specimens are plotted against the corresponding fundamental frequencies determined in each case, a hyperbolic calibration curve is obtained such as indicated in Fig. 5 of the drawings. A separate calibration curve must be drawn up for each different material of the specimens to be measured.

Utilizing the applicant's method, the thickness of a test specimen may be determined in the following manner:

After the condenser 28 has been adjusted to compensate for the static capacitance of the crystal assemblage A as described hereinbefore, the driving frequency of the oscillator 24 is progressively varied over a given range whereby a number of consecutive resonant frequencies are determined. The numerical difference between each two successive resonant frequencies is found, and an average taken of all of these values. This average value is representative of the fundamental frequency $f_1$ for the particular specimen under test. The thickness of the specimen under test may then be determined from a calibration curve such as shown in Fig. 5 of the drawings. For instance, if the fundamental frequency for a given specimen is represented by $a$ cycles per second, the corresponding thickness of the specimen may be determined from the curve to be $b$ centimeters, while a fundamental frequency of $a'$ cycles for a different specimen corresponds to a thickness of $b'$ centimeters for that specimen.

For the measurement of a large number of test parts of the same material where only a slight discrepancy exists between the thicknesses of any two specimens, it is possible to calibrate the instrument so that thicknesses may be read off directly. One method of accomplishing this is by attaching a scale 39 calibrated to read in terms of thickness to the variable condenser 23 which is connected to the oscillator 24.

As the frequency of the oscillator 24 is progressively varied over a wide range, there will be observed in addition to the recurring resonant responses for those frequencies for which the specimen 22 is an integral number of half wavelengths thick, a broader resonance effect which depends on the vibrational characteristics of the crystal itself. This is seen by reference to Fig. 6 of the drawings. The crystals employed in the measuring instrument are preferably chosen so that their natural resonant frequencies are slightly higher than the means resonant frequencies to be measured. If the natural resonant reaction of the crystal to frequency changes is not too sharp, the embodiment of the applicant's device as shown in Figs. 1, 2 and 3 will operate satisfactorily, the changes in current response with frequency being substantially as shown in Fig. 6 of the drawings. For the purpose of this disclosure, the applicant prefers the crystal vibrations substantially undamped as it is desired to obtain the maximum possible vibrational response.

The improved apparatus for thickness measurement as conceived by the applicant is not to be construed as limited to the particular embodiments disclosed herein, or to the use of any particular element shown by way of illustration in the specification and drawings.

What is claimed is:

1. A thickness gauge for test parts which comprises in combination a piezoelectric crystal unit having a compressional-wave radiation pattern comprising a single directed beam, electrodes attached thereto, a metal base, an insulating support for mounting said crystal unit on the upper side of said base, the lower portion of said base being approximately a quarter wavelength thick in the vibrating frequency of the crystal unit whereby it serves as a high impedance to the vibrations of said crystal unit, a cover for said crystal unit comprising in combination a conformable cap for contact with test parts, and a metal frame, said cap fitted in an oil-tight joint to said frame, means for fastening said cover on the upper portion of said base in an oil-tight joint whereby said crystal unit is maintained in an oil-tight chamber, an oil bath maintained in said chamber, circuit means to electrically connect said crystal assemblage as one arm of an impedance bridge, a capacitance connected to function as a balancing impedance in said bridge circuit, a current indicating device in circuit relationship with said bridge circuit, an oscillator electrically coupled to said bridge circuit to drive said crystal unit at a desired frequency of oscillation, and means for progressively varying the frequency of said oscillator.

2. A thickness gauge for test parts comprising in combination a piezoelectric crystal unit having a compressional-wave radiation pattern comprising a single directed beam, electrodes connected thereto, a supporting base for said crystal unit which functions as a high impedance to the vibrations of said crystal unit, a cap comprising resilient material fastened to the upper portion of the base of said crystal unit, said cap serving doubly to enclose said crystal unit in a liquid-tight chamber and to contact the surface of test parts, a liquid bath in said chamber having an impedance to the crystal vibrations substantially the same as the impedance of said resilient cap, means for electrically connecting said crystal assemblage through said electrodes as one arm of an impedance bridge, a variable impedance connected to function as a balancing arm in said bridge circuit, a current indicating device connected across said bridge circuit, an oscillator electrically coupled to said bridge circuit to drive said crystal at a desired frequency of oscillation, and means for varying the frequency of said oscillator.

3. A thickness gauge for test parts comprising in combination a piezoelectric crystal unit, electrodes connected thereto, a chamber enclosing said crystal unit and containing a liquid bath for immersing said crystal unit, said chamber having a conformable outer surface portion for transmitting vibrations to a test part, means for electrically connecting said crystal unit through said electrodes as one arm of an impedance bridge, an impedance connected to function as a balancing arm in said bridge circuit, a current indicating device in energy transfer relation to said bridge circuit, an oscillator in energy transfer relation to said bridge circuit to drive said crystal at a desired frequency of oscillation, and means for varying the frequency of said oscillator.

WARREN P. MASON.

REFERENCES CITED

The following references are of record in the file of this patent:

UNITED STATES PATENTS

| Number | Name | Date |
|---|---|---|
| 1,414,077 | Fessenden | Apr. 25, 1922 |
| 1,980,171 | Amy | Nov. 13, 1934 |
| 1,990,085 | Mudge et al. | Feb. 5, 1935 |
| 1,994,658 | Marrison | Mar. 19, 1935 |
| 2,105,479 | Hayes | Jan. 18, 1938 |
| 2,138,036 | Kunze | Nov. 29, 1938 |
| 2,164,125 | Sokoloff | June 27, 1939 |
| 2,280,226 | Firestone | Apr. 21, 1942 |
| 2,283,285 | Pohlman | May 19, 1942 |
| 2,384,465 | Harrison | Sept. 11, 1945 |
| 2,405,604 | Pope | Aug. 13, 1946 |
| 2,431,233 | Erwin | Nov. 18, 1947 |
| 2,439,131 | Firestone | Apr. 6, 1948 |

FOREIGN PATENTS

| Number | Country | Date |
|---|---|---|
| 464,516 | Germany | Aug. 18, 1928 |